US012586185B2

(12) United States Patent
Yoshikawa et al.

(10) Patent No.: US 12,586,185 B2
(45) Date of Patent: Mar. 24, 2026

(54) BLOOD FLOW EXTRACTION IMAGE FORMING DEVICE, METHOD OF FORMING BLOOD FLOW EXTRACTION IMAGE, AND BLOOD FLOW EXTRACTION IMAGE FORMING PROGRAM

(71) Applicant: FUJIFILM Healthcare Corporation, Kashiwa (JP)

(72) Inventors: Hideki Yoshikawa, Chiba (JP); Kosuke Fujita, Chiba (JP); Tetsuya Yamada, Chiba (JP)

(73) Assignee: FUJIFILM Corporation, Tokyo (JP)

( * ) Notice: Subject to any disclaimer, the term of this patent is extended or adjusted under 35 U.S.C. 154(b) by 316 days.

(21) Appl. No.: 18/211,359

(22) Filed: Jun. 19, 2023

(65) Prior Publication Data

US 2024/0005490 A1     Jan. 4, 2024

(30) Foreign Application Priority Data

Jun. 29, 2022   (JP) ................................. 2022-104477

(51) Int. Cl.
*G06T 7/00*           (2017.01)
(52) U.S. Cl.
CPC .. *G06T 7/0012* (2013.01); *G06T 2207/10132* (2013.01); *G06T 2207/30104* (2013.01)
(58) Field of Classification Search
CPC .................... A61B 8/06; A61B 8/5223; G06T 2207/10132
See application file for complete search history.

(56) References Cited

U.S. PATENT DOCUMENTS

| 2018/0220997 A1* | 8/2018 | Song | G16H 50/30 |
| 2020/0178938 A1* | 6/2020 | Alizad | A61B 8/5276 |

(Continued)

FOREIGN PATENT DOCUMENTS

| JP | 2019-054938 A | 4/2019 |
| JP | 2019-097795 A | 6/2019 |
| JP | 2020-185122 A | 11/2020 |

*Primary Examiner* — Benjamin O Dulaney

(74) *Attorney, Agent, or Firm* — Paul Teng

(57)           ABSTRACT

A correlation matrix calculation unit calculates a correlation matrix $R_{zx}$ for each data element of the frame data. A blood flow luminance image forming unit forms a blood flow extraction filter $P_{k,N}$ on the basis of an eigenvalue $\lambda_i$ of a rank equal to or lower than a first threshold rank, the eigenvalue being obtained by singular value decomposition on the correlation matrix $R_{zx}$, and an eigenvector $w_i$, $w_i^H$ corresponding to the eigenvalue $\lambda i$ and applies the blood flow extraction filter $P_{k,N}$ to frame data F, thereby to forming a blood flow luminance image $U_{k,N}$. A tissue image forming unit forms a tissue image including tissue components on the basis of a signal value of each data element forming the plurality of pieces of the frame data. A blood flow extraction image forming unit subtracts the tissue image from the blood flow luminance image $U_{k,N}$, thereby forming a blood flow extraction image $U_{out}$.

7 Claims, 12 Drawing Sheets

(56)  References Cited

U.S. PATENT DOCUMENTS

| | | | |
|---|---|---|---|
| 2021/0022702 A1* | 1/2021 | Yoshikawa | G01S 7/52036 |
| 2022/0096055 A1* | 3/2022 | Di Ianni | A61B 8/5207 |
| 2022/0414836 A1* | 12/2022 | Yoshikawa | G01S 7/52026 |
| 2023/0086332 A1* | 3/2023 | Huang | A61B 8/488 |
| | | | 600/437 |

* cited by examiner

VARIANCE
VALUE

RANK

ADJUSTMENT OF COEFFICIENT α

SIGNAL VALUE

LARGE

SMALL

FRAME DATA

SPATIAL THINNING

CALCULATE CORRELATION MATRIX

BLOOD FLOW EXTRACTION IMAGE FORMING DEVICE, METHOD OF FORMING BLOOD FLOW EXTRACTION IMAGE, AND BLOOD FLOW EXTRACTION IMAGE FORMING PROGRAM

CROSS REFERENCE TO RELATED APPLICATION

This application claims priority to Japanese Patent Application No. 2022-104477 filed on Jun. 29, 2022, which is incorporated herein by reference in its entirety including the specification, claims, drawings, and abstract.

TECHNICAL FIELD

The present specification discloses a blood flow extraction image forming device, a method of forming a blood flow extraction image, and a blood flow extraction image forming program. In particular, the present specification discloses improvement of detective flow imaging (DFI) which forms a blood flow extraction image by visualizing a blood flow of a subject on the basis of an ultrasonic signal indicating signal intensity of a reflected wave of an ultrasonic wave from the subject.

BACKGROUND

Conventionally, an ultrasound diagnostic device is widely used as a medical examination device that presents information of the invisible inside of a subject (a living body in the present specification) in the form of a numerical value or an ultrasonic image. A basic method of forming an ultrasonic image is to transmit ultrasonic waves to an imaging target in the subject and convert signal intensity of reflected waves of the ultrasonic waves from the subject into luminance. Therefore, the formed ultrasonic image shows morphology of tissue.

In recent years, there has been developed a technique of forming an ultrasonic image showing a blood flow of a subject by performing principal component analysis on ultrasonic signals. Principal component analysis is a statistical analysis method based on an analysis method of singular value decomposition (including eigenvalue decomposition). In a case where principal component analysis is applied to ultrasonic signals, information that better reproduces the original ultrasonic signals (ultrasonic image) (e.g. relatively high luminance components such as a boundary and parenchyma of tissue) is classified as a higher principal component, and conversely, information having a low information dominant rate (e.g. dynamic blood flow components having lower reflectance than tissue) is classified as a lower principal component. By using the above characteristic, it is proposed to form an image by specifically extracting blood flow components from ultrasonic signals.

For example, JP 2019-54938 A discloses a method of performing principal component analysis on Doppler signals obtained by transmitting and receiving ultrasonic waves to and from a subject (signals indicating a phase shift (Doppler shift frequency) calculated by performing processing such as autocorrelation calculation on a plurality of ultrasonic signals) to suppress components (clutter components) derived from movement of tissue due to a change in posture, respiration, heartbeat, or the like, thereby enhancing quality of a blood flow image. For example, a main filter matrix is calculated so as to remove a first principal component to a third principal component corresponding to the clutter components of the Doppler signals and maintain a fourth principal component to a sixth principal component corresponding to blood flow components. The main filter matrix is applied to the Doppler signals to form an image having suppressed clutter components. Specifically, a first specific principal component (e.g. the first principal component) and a second specific principal component (e.g. the sixth principal component) are extracted from the Doppler signals, and a ratio thereof is used as an index to adjust (weight) luminance. For example, in a case where the ratio of the sixth principal component to the first principal component is used as the index, the index is close to 1 for a pixel located in a blood vessel, and the index is close to 0 for a pixel located in an organ tissue. Therefore, pixels located in the organ tissue are hardly visualized, and, as a result, the clutter components are removed. JP 2020-185122 A discloses a method of adaptively changing an eigen-order to be imaged with respect to information obtained by principal component analysis and further discloses a method of adjusting signal intensity of a signal to be imaged in accordance with the eigen-order.

Meanwhile, there will be considered a case where a blood flow extraction image in which a blood flow of a subject is extracted is formed on the basis of ultrasonic signals indicating signal intensity of reflected waves of ultrasonic waves from the subject, instead of Doppler signals disclosed in JP 2019-54938 A. As described above, this technique is also referred to as DFI. In DFI, singular value decomposition is performed on the ultrasonic signals indicating the signal intensity of the reflected waves. A blood flow extraction filter, which is formed based on lower-rank signal components obtained by performing singular value decomposition on the ultrasonic signals, mainly extracts blood flow components and removes tissue components. Therefore, by applying the blood flow extraction filter to the ultrasonic signals, it is possible to form a blood flow extraction image in which a microvessel (blood flow) is extracted.

Here, signal components extracted by the blood flow extraction filter may include not only signal components indicating the blood flow but also clutter components that are signal components derived from tissue due to body motion or the like of the subject. Therefore, the clutter components may also appear in the blood flow extraction image formed by applying the blood flow extraction filter to the ultrasonic signals. For example, a part of the liver near the heart is strongly affected by pulsation, and thus signals regarding a microvessel are hidden by the clutter components. This significantly reduces visibility of the microvessel.

In order to obtain a suitable blood flow extraction image, it is necessary to suppress the clutter components, without impairing signal components that truly indicate a blood flow among signal components extracted by the blood flow extraction filter.

An object of a blood flow extraction image forming device, a method of forming a blood flow extraction image, or a blood flow extraction image forming program according to the present specification is to further reduce clutter components in a blood flow extraction image in which a microvessel is extracted.

SUMMARY OF THE INVENTION

A blood flow extraction image forming device according to the present specification includes: a frame data acquisition unit that acquires a plurality of pieces of frame data for a plurality of frames, the plurality of pieces of the frame data being generated on the basis of a plurality of reception signals obtained by causing an ultrasonic probe that transmits and receives ultrasonic waves to and from a subject to transmit ultrasonic waves to the same scanning plane a plurality of times and receive reflected waves of the ultrasonic waves from the subject having signal values indicating signal intensity of the reflected waves; a correlation matrix calculation unit that calculates a correlation matrix indicating a correlation between the signal values in the plurality of pieces of the frame data for each data element of the frame data corresponding to each pixel of an ultrasonic image formed based on the frame data; a singular value decomposition calculation unit that performs singular value decomposition on the correlation matrix to calculate a plurality of singular values whose ranks are defined in order of magnitude and a plurality of singular vectors corresponding to the singular values; a blood flow luminance image forming unit that forms a blood flow luminance image by applying, to the frame data, a blood flow extraction filter formed based on the singular value of a rank equal to or lower than a preset first threshold rank and the singular vector corresponding to the singular value; a tissue image forming unit that forms a tissue image on the basis of the signal value of each data element forming the plurality of pieces of the frame data; and a blood flow extraction image forming unit that forms a blood flow extraction image by subtracting the tissue image from the blood flow luminance image.

The blood flow luminance image, which is obtained by applying, to the frame data, the blood flow extraction filter based on the singular value of a lower rank (rank equal to or lower than the first threshold rank) and the singular vector, the singular value being obtained by performing singular value decomposition on the correlation matrix, includes many blood flow components representing a microvessel (blood flow). However, the blood flow luminance image may also include clutter components. Meanwhile, the tissue image does not include many blood flow components, but includes tissue components and clutter components. Therefore, with the above configuration, when the tissue image is subtracted from the blood flow luminance image, it is possible to obtain a blood flow extraction image in which the clutter components are removed from the blood flow luminance image while the blood flow components included in the blood flow luminance image remain.

The tissue image forming unit may form the tissue image by applying, to the frame data, a tissue extraction filter formed based on the singular value of a rank higher than the first threshold rank and the singular vector corresponding to the singular value.

With the above configuration, it is possible to further reduce the blood flow components included in the tissue image and thus to obtain the blood flow extraction image in which the clutter components are removed from the blood flow luminance image while the blood flow components included in the blood flow luminance image further remain.

A calculation target region specification unit that specifies a calculation target region including the data element corresponding to tissue in the frame data may be further provided, and the correlation matrix calculation unit may calculate the correlation matrix only for the calculation target region. In particular, the calculation target region specification unit may set, as the calculation target region, thinned frame data obtained by thinning out some of the data elements forming the frame data. Alternatively, the calculation target region specification unit may specify, as the calculation target region, a set of the data elements having the signal values equal to or larger than a threshold signal value among the plurality of data elements forming the frame data. Alternatively, the calculation target region specification unit may acquire high-rank extraction data including signal components of a rank higher than a second threshold rank by performing singular value decomposition on the plurality of pieces of the frame data, thin out some of the data elements forming the high-rank extraction data, and set thinned frame data as the calculation target region. Alternatively, the calculation target region specification unit may acquire high-rank extraction data including signal components of a rank higher than a second threshold rank by performing singular value decomposition on the plurality of pieces of the frame data and set, as the calculation target region, a set of the data elements having the signal values equal to or larger than the threshold signal value among the plurality of data elements forming the high-rank extraction data.

The correlation matrix is subjected to singular value decomposition to form the blood flow extraction filter or the tissue extraction filter. Therefore, as a result of singular value decomposition of the correlation matrix, it is not always necessary to obtain the correlation matrix for the entire frame data, so long as the tissue extraction filter can be formed based on the signal components of a higher rank and the blood flow extraction filter can be formed based on the signal components of a lower rank. Therefore, with the above configuration, a calculation target of the correlation matrix is limited, and thus an amount of calculation for obtaining the correlation matrix can be reduced.

The blood flow extraction image forming unit may form the blood flow extraction image by subtracting the tissue image multiplied by a coefficient from the blood flow luminance image.

With the above configuration, an amount of signals to be subtracted from the blood flow luminance image can be adjusted by adjusting the coefficient.

The blood flow extraction image forming unit may determine the coefficient on the basis of input from a user.

With the above configuration, the user can obtain the blood flow extraction image by subtracting a desired amount of signals from the blood flow luminance image.

The blood flow extraction image forming device according to the present specification includes: a frame data acquisition unit that acquires a plurality of pieces of frame data for a plurality of frames, the plurality of pieces of the frame data being generated on the basis of a plurality of reception signals obtained by causing an ultrasonic probe that transmits and receives ultrasonic waves to and from a subject to transmit ultrasonic waves to the same scanning plane a plurality of times and receive reflected waves of the ultrasonic waves from the subject and having signal values indicating signal intensity of the reflected waves; a calculation target region specification unit that specifies, in the frame data, a calculation target region including a data element of the frame data corresponding to each pixel of an ultrasonic image formed based on the frame data, the data element corresponding to tissue; a correlation matrix calculation unit that calculates a correlation matrix indicating a correlation between the signal values in the plurality of pieces of the frame data for each data element forming the frame data and calculates the correlation matrix only for the calculation target region; a singular value decomposition calculation unit that performs singular value decomposition on the correlation matrix to calculate a plurality of singular values whose ranks are defined in order of magnitude and a plurality of singular vectors corresponding to the singular values; and an image processing unit performs at least one of blood flow luminance image formation processing of forming a blood flow luminance image by applying, to the frame data, a blood flow extraction filter formed based on the singular value of a rank equal to or lower than a preset first threshold rank and the singular vector corresponding to the singular value or tissue image formation processing of forming a tissue image by applying, to the frame data, a tissue extraction filter formed based on the singular value of a rank higher than the first threshold rank and the singular vector corresponding to the singular value.

A method of forming a blood flow extraction image according to the present specification includes: a frame data acquisition step of acquiring a plurality of pieces of frame data for a plurality of frames, the plurality of pieces of the frame data being generated on the basis of a plurality of reception signals obtained by causing an ultrasonic probe that transmits and receives ultrasonic waves to and from a subject to transmit ultrasonic waves to the same scanning plane a plurality of times and receive reflected waves of the ultrasonic waves from the subject and having signal values indicating signal intensity of the reflected waves; a correlation matrix calculation step of calculating a correlation matrix indicating a correlation between the signal values in the plurality of pieces of the frame data for each data element of the frame data corresponding to each pixel of an ultrasonic image formed based on the frame data; a singular value decomposition calculation step of performing singular value decomposition on the correlation matrix to calculate a plurality of singular values whose ranks are defined in order of magnitude and a plurality of singular vectors corresponding to the singular values; a blood flow luminance image forming step of forming a blood flow luminance image by applying, to the frame data, a blood flow extraction filter formed based on the singular value of a rank equal to or lower than a preset first threshold rank and the singular vector corresponding to the singular value; a tissue image forming step of forming a tissue image on the basis of the signal value of each data element forming the plurality of pieces of the frame data; and a blood flow extraction image forming step of forming a blood flow extraction image by subtracting the tissue image from the blood flow luminance image.

A blood flow extraction image forming program according to the present specification causes a computer to function as: a frame data acquisition unit that acquires a plurality of pieces of frame data for a plurality of frames, the plurality of pieces of the frame data being generated on the basis of a plurality of reception signals obtained by causing an ultrasonic probe that transmits and receives ultrasonic waves to and from a subject to transmit ultrasonic waves to the same scanning plane a plurality of times and receive reflected waves of the ultrasonic waves from the subject and having signal values indicating signal intensity of the reflected waves; a correlation matrix calculation unit that calculates a correlation matrix indicating a correlation between the signal values in the plurality of pieces of the frame data for each data element of the frame data corresponding to each pixel of an ultrasonic image formed based on the frame data; a singular value decomposition calculation unit that performs singular value decomposition on the correlation matrix to calculate a plurality of singular values whose ranks are defined in order of magnitude and a plurality of singular vectors corresponding to the singular values; a blood flow luminance image forming unit that forms a blood flow luminance image by applying, to the frame data, a blood flow extraction filter formed based on the singular value of a rank equal to or lower than a preset first threshold rank and the singular vector corresponding to the singular value; a tissue image forming unit that forms a tissue image on the basis of the signal value of each data element forming the plurality of pieces of the frame data; and a blood flow extraction image forming unit that forms a blood flow extraction image by subtracting the tissue image from the blood flow luminance image.

The blood flow extraction image forming device, the method of forming a blood flow extraction image, or the blood flow extraction image forming program according to the present specification can further reduce clutter components in a blood flow extraction image in which a microvessel is extracted.

DESCRIPTION OF EMBODIMENTS

Figure 1:
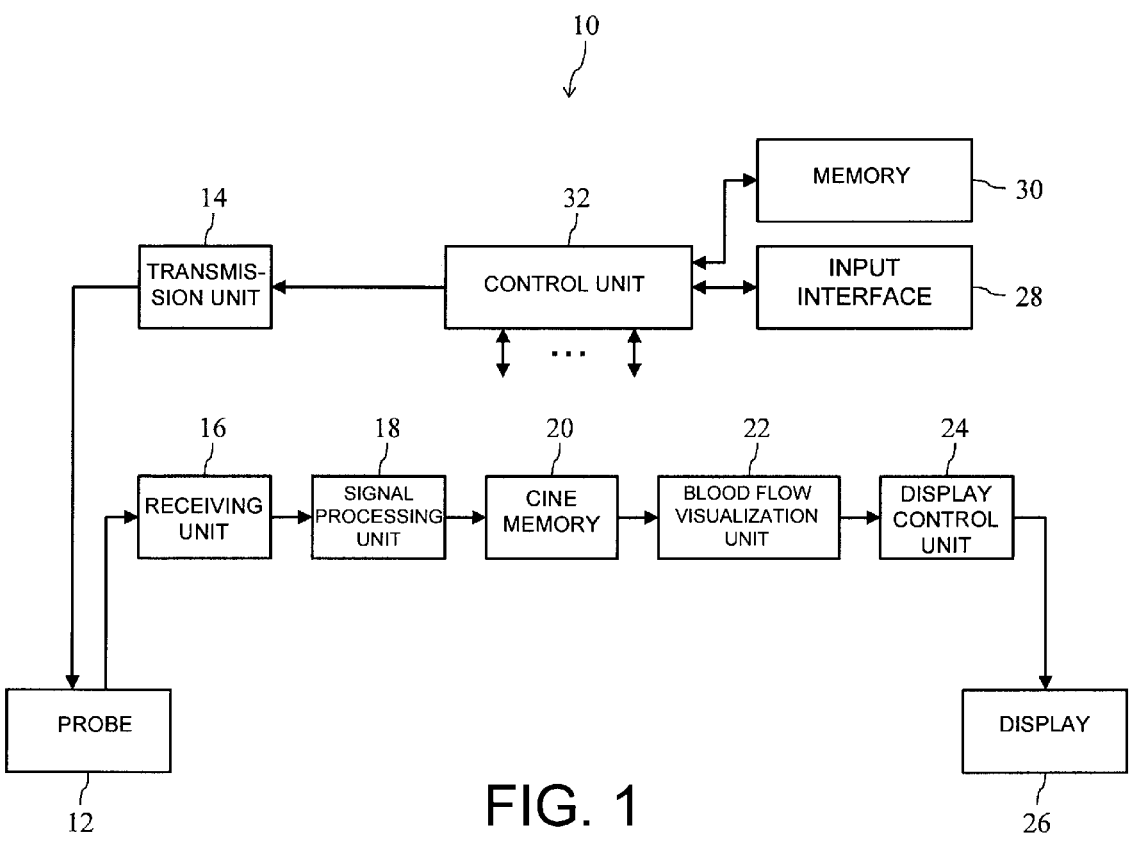
FIG. 1 is a schematic configuration diagram of an ultrasound diagnostic device according to the present embodiment.

FIG. 1 is a schematic configuration diagram of an ultrasound diagnostic device 10 serving as a blood flow extraction image forming device according to the present embodiment. The ultrasound diagnostic device 10 is installed in a medical institution such as a hospital and forms and displays an ultrasonic image on the basis of reception signals obtained from ultrasonic waves transmitted to and received from a subject that is a living body.

In particular, as described in detail later, the ultrasound diagnostic device 10 forms a blood flow extraction image that visualizes a microvessel (blood flow) of the subject on the basis of ultrasonic signals (a plurality of pieces of frame data in the present embodiment) indicating signal intensity of reflected waves of ultrasonic waves from the subject. That is, the ultrasound diagnostic device 10 has a DFI function.

A probe 12, which is an ultrasonic probe, is a device that transmits ultrasonic waves and receives reflected waves. Specifically, the probe 12 is brought into contact with a body surface of the subject, transmits ultrasonic waves to the subject, and receives reflected waves reflected by tissue in the subject. The probe 12 includes a vibration element array including a plurality of vibration elements. Each vibration element included in the vibration element array receives supply of a transmission signal that is an electric signal from a transmission unit 14 described later, thereby generating an ultrasonic beam. Further, each vibration element included in the vibration element array receives a reflected wave from the subject, converts the reflected wave into a reception signal that is an electric signal, and transmits the reception signal to a receiving unit 16 described later.

The transmission unit 14 functions as a transmission beamformer. At the time of transmitting ultrasonic waves, the transmission unit 14 supplies a plurality of transmission signals to the probe 12 (specifically, the vibration element array) in parallel. Therefore, the probe 12 transmits ultrasonic beams. Specifically, ultrasonic beams are scanned on a scanning plane in response to the transmission signals. In the present embodiment, ultrasonic beams are scanned on the same scanning plane a plurality of times (at different timings).

The receiving unit 16 serving as a frame data acquisition unit functions as a reception beamformer. At the time of receiving reflected waves, the receiving unit 16 receives a plurality of reception signals from the probe 12 (specifically, the vibration element array) in parallel. The receiving unit 16 performs processing such as phasing addition processing on the reception signals, thereby generating received beam data. The received beam data has a plurality of signal values indicating signal intensity of the reflected waves from respective depths of the subject in a depth direction of the subject. A plurality of pieces of received beam data for the scanning plane, which corresponds to one B-mode image (tomographic image in which amplitude strength of the reflected waves is converted into luminance), is used to generate frame data. As described above, in the present embodiment, ultrasonic waves are transmitted to the same scanning plane a plurality of times. Thus, a plurality of pieces of frame data for a plurality of frames obtained at different timings for the same scanning plane are generated.

A signal processing unit 18 performs various λinds of signal processing including detection processing, logarithmic amplification processing, gain correction processing, filter processing, or the like on the frame data (each piece of the received beam data) from the receiving unit 16.

A cine memory 20 stores the plurality of pieces of frame data processed by the signal processing unit 18. The cine memory 20 is a first in first out (FIFO) buffer that outputs the frame data from the signal processing unit 18 in the input order.

A blood flow visualization unit 22 forms a blood flow extraction image in which a microvessel (blood flow) is extracted on the basis of the plurality of pieces of frame data (ultrasonic signals indicating signal intensity of reflected waves) obtained by transmitting ultrasonic waves to the same scanning plane a plurality of times. Details of processing performed by the blood flow visualization unit 22 will be described later.

A display control unit 24 displays various images including the blood flow extraction image formed by the blood flow visualization unit 22 on a display 26 including, for example, a liquid crystal panel.

An input interface 28 includes, for example, a button, a trackball, or a touchscreen. The input interface 28 is for inputting a user's instruction to the ultrasound diagnostic device 10.

A memory 30 includes a hard disk drive (HDD), a solid state drive (SSD), an embedded multimedia card (eMMC), a read only memory (ROM), a random access memory (RAM), or the like. The memory 30 stores a blood flow extraction image forming program for operating each unit of the ultrasound diagnostic device 10. The blood flow extraction image forming program can also be stored in a computer-readable non-transitory storage medium such as a universal serial bus (USB) memory or a CD-ROM. The ultrasound diagnostic device 10 can read the blood flow extraction image forming program from such a storage medium and execute the blood flow extraction image forming program.

A control unit 32 includes at least one of a general-purpose processor (e.g. a central processing unit (CPU)) and a dedicated processor (e.g. a graphics processing unit (GPU), an application specific integrated circuit (ASIC), a field-programmable gate array (FPGA), or a programmable logic device). The control unit 32 may be configured not by one processing device, but by cooperation of a plurality of processing devices existing at physically separated positions. The control unit 32 controls each unit of the ultrasound diagnostic device 10 according to the blood flow extraction image forming program stored in the memory 30.

The transmission unit 14, the receiving unit 16, the signal processing unit 18, the blood flow visualization unit 22, and the display control unit 24 each include one or a plurality of processors, chips, electric circuits, and the like. Those units may be implemented by cooperation of hardware and software.

Figure 2:
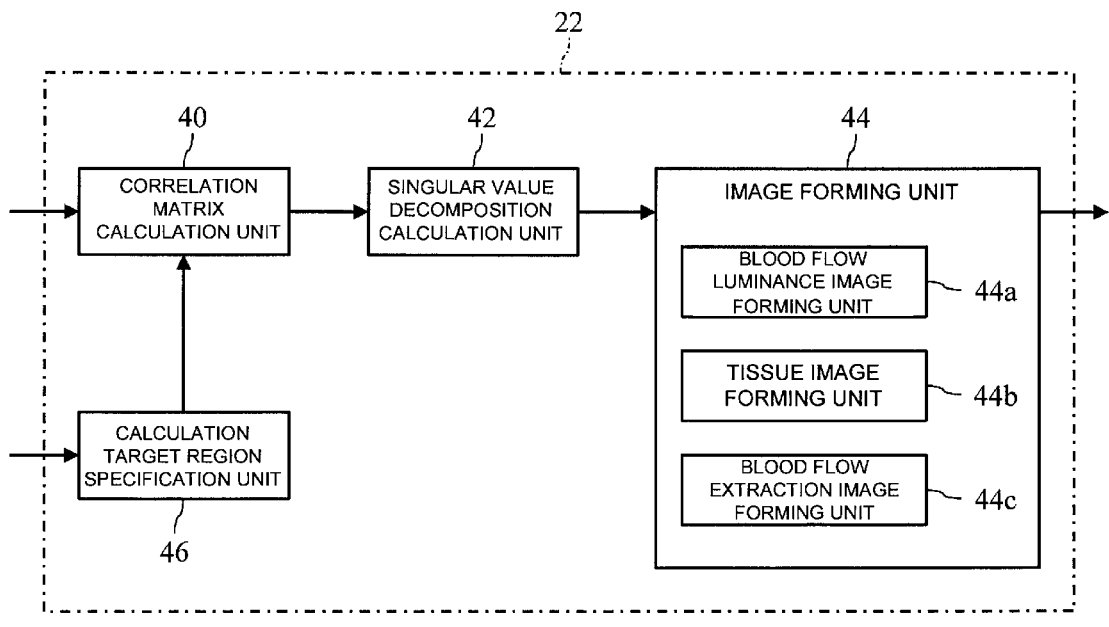
FIG. 2 is a schematic configuration diagram of a blood flow visualization unit.

FIG. 2 is a schematic configuration diagram of the blood flow visualization unit 22. Hereinafter, details of the processing in the blood flow visualization unit 22 will be described with reference to FIG. 2 and subsequent drawings.

Figure 3:
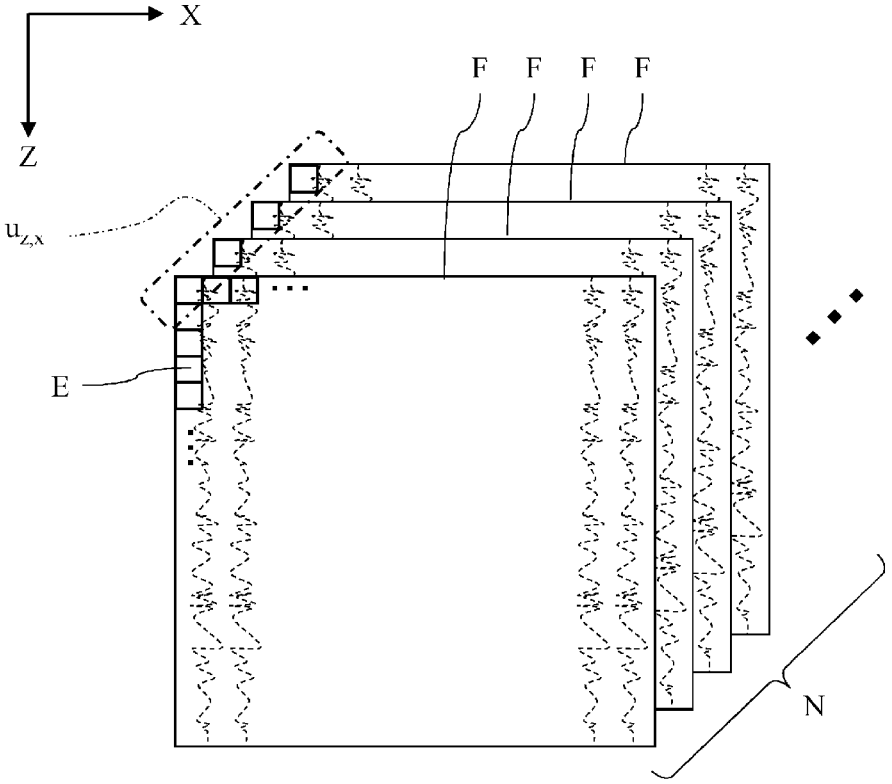
FIG. 3 is a conceptual diagram illustrating a plurality of pieces of frame data.

First, a plurality of pieces of frame data to be processed by the blood flow visualization unit 22 will be described. FIG. 3 is a conceptual diagram illustrating a plurality of pieces of frame data F. As described above, when signal intensity of reflected waves included in one piece of the frame data F is converted into luminance, one B-mode image is formed. In the present specification, a data portion of the frame data F corresponding to each pixel of the B-mode image will be referred to as a data element E. In the one piece of the frame data F, the data elements E are two-dimensionally arranged in an azimuth direction (X axis) and a depth direction (Z axis). Each data element E has a signal value indicating the signal intensity of the reflected wave (hereinafter, also simply referred to as a "signal value").

Because the pieces of the frame data F are acquired at different timings as described above, the plurality of (N) pieces of the frame data F are arranged in a time direction. The N pieces of the frame data F are used to form a blood flow extraction image. A more accurate blood flow extraction image (having further reduced clutter components) can be formed as N is larger, but an amount of calculation is increased accordingly. In the present embodiment, N is set to a value of approximately 10 to 20.

The plurality of pieces of the frame data F are arranged in the time direction, and thus, focusing on a certain data element E, a set of the corresponding data elements E between the plurality of pieces of the frame data F, which is a set of the data elements E (N data elements E) arranged in the time direction, can be defined. In the present specification, a vector having such N data elements E as an element is defined and denoted by a vector $u_{zx}$. For example, un is a vector having N data elements E located at (z, x)=(1, 1) of each piece of the frame data F as an element. Then, a matrix having a vector $u_{zx}$ (z=1 to Z, x=1 to X) as an element is denoted by a matrix U. The matrix U indicates the plurality of pieces of the frame data F for forming a blood flow extraction image and is expressed as follows.

[Math. 1]

$$U = \begin{bmatrix} u_{11} & \cdots & u_{1X} \\ \vdots & \ddots & \vdots \\ u_{Z1} & \cdots & u_{ZX} \end{bmatrix}$$

A correlation matrix calculation unit 40 calculates a correlation matrix indicating a correlation between signal values in the plurality of pieces of the frame data F for each data element E of the frame data F. That is, the correlation matrix calculation unit 40 calculates, for each vector $u_{zx}$, a correlation between elements included in the vector $u_{zx}$. In the present embodiment, the correlation matrix calculation unit 40 calculates a correlation matrix for the entire frame data F (i.e. all vectors $u_{zx}$ (z=1 to Z, x=1 to X)).

The correlation matrix (covariance matrix with itself) can be expressed by a product of the vector $u_{zx}$ and transposition thereof. Thus, a correlation matrix $R_{zx}$ is calculated by the following Expression 1.

[Math. 2]

$$R_{zx} = u_{zx}u_{zx}^H \qquad \text{(Expression 1)}$$

Each correlation matrix $R_{zx}$ for each vector $u_{zx}$ is an N×N square matrix.

The correlation matrix calculation unit 40 averages each correlation matrix $R_{zx}$ for each vector $u_{zx}$ by all the data elements E. An average correlation matrix is shown by the following Expression 2.

[Math. 3]

$$\bar{R} = \frac{1}{XZ}\sum_{z=1}^{Z}\sum_{x=1}^{X} R_{zx} \qquad \text{(Expression 2)}$$

If the following singular value decomposition is performed for each correlation matrix $R_{zx}$, an amount of calculation thereof may be enormous. In addition, the correlation matrix $R_{zx}$ to be subjected to singular value decomposition may relate only to tissue components or only to blood flow components, and thus it may be difficult to perform appropriate singular value decomposition. Therefore, in the present embodiment, an average correlation matrix is calculated by averaging the correlation matrices $R_{zx}$ and is subjected to singular value decomposition.

A singular value decomposition calculation unit 42 performs singular value decomposition on the correlation matrix calculated by the correlation matrix calculation unit 40. In the present embodiment, the singular value decomposition calculation unit 42 performs singular value decomposition on the average correlation matrix. In the present embodiment, the average correlation matrix is a square matrix, and thus the singular value decomposition calculation unit 42 performs eigenvalue decomposition on the average correlation matrix. Eigenvalue decomposition of the average correlation matrix is shown by the following Expression 3. Note that a case where the matrix subjected to singular value decomposition is a non-square matrix will be described later.

[Math. 4]

$$\bar{R} = W\Lambda W^H = \sum_{i=1}^{N}\lambda_i w_i w_i^H \qquad \text{(Expression 3)}$$

In Expression 3, a matrix $\Lambda$ is a diagonal matrix in which N eigenvalues $\lambda_i$ serving as the singular values are arranged in diagonal elements, and is expressed as follows.

[Math. 5]

$$\Lambda = \begin{bmatrix} \lambda_1 & 0 & 0 & 0 \\ 0 & \lambda_2 & 0 & 0 \\ 0 & 0 & \ddots & \vdots \\ 0 & 0 & \cdots & \lambda_N \end{bmatrix}$$

A matrix W is a matrix in which N eigenvectors $w_i$ serving as singular vectors corresponding to the N eigenvalues $\lambda_i$ are arranged. As described above, the average correlation matrix is represented by a product sum of the N eigenvalues $\lambda_i$ and the N eigenvectors $w_i$, $w_i^H$ corresponding to the eigenvalues $\lambda_i$ by eigenvalue decomposition. In other words, the singular value decomposition calculation unit 42 calculates the N eigenvalues $\lambda_i$ representing the average correlation matrix and the N eigenvectors $w_i$, $w_i^H$ corresponding to the respective eigenvalues $\lambda_i$ by eigenvalue decomposition.

In the matrix $\Lambda$, the plurality of eigenvalues $\lambda_i$ is arranged in order of magnitude thereof. That is, $\lambda_1 > \lambda_2 > \ldots > \lambda_N$ is established. Ranks of the plurality of eigenvalues are defined in order of magnitude thereof. For example, $\lambda_1$ is an eigenvalue of a rank 1, $\lambda_2$ is an eigenvalue of a ran$\lambda$2, and $\lambda_N$ is an eigenvalue of a rank N.

Here, the eigenvalue $\lambda_i$ of a higher rank (closer to the rank 1) and the eigenvector $w_i$, $w_i^H$ corresponding thereto include information that better reproduces the average correlation matrix, and the eigenvalue $\lambda_i$ of a lower rank (closer to the rank N) and the eigenvector $w_i$, $w_i^H$ corresponding thereto include information that is not much related to reproduction of the average correlation matrix.

Figure 4:
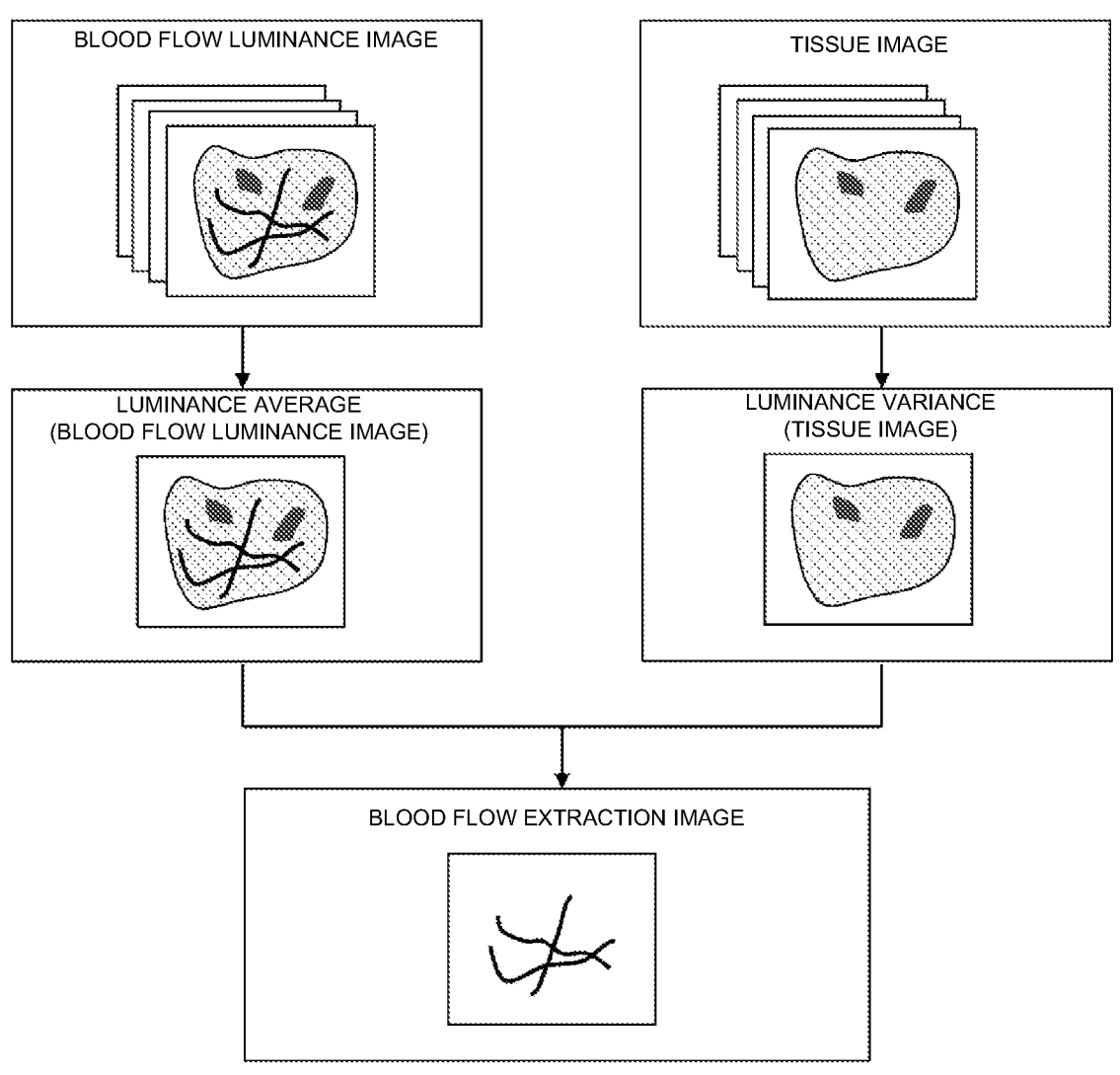
FIG. 4 is a conceptual diagram illustrating a flow of blood flow extraction image formation processing.

An image forming unit 44 forms a blood flow extraction image that visualizes a microvessel (blood flow) of the subject on the basis of the matrix U. As illustrated in FIG. 2, the image forming unit 44 functions as a blood flow luminance image forming unit 44a, a tissue image forming unit 44b, and a blood flow extraction image forming unit 44c. FIG. 4 is a conceptual diagram illustrating a flow of blood flow extraction image formation processing by the image forming unit 44. Hereinafter, details of each function of the image forming unit 44 will be described, and FIG. 4 will be referred to as appropriate.

First, the blood flow luminance image forming unit 44a forms a blood flow extraction filter on the basis of the eigenvalue $\lambda_i$ of a rank equal to or lower than a preset first threshold rank and the eigenvector $w_i$, $w_i^H$ corresponding to the eigenvalue $\lambda_i$ among the plurality of eigenvalues $\lambda_i$ and eigenvectors $w_i$, $w_i^H$ calculated by the singular value decomposition calculation unit 42. Note that the expression "equal to or lower than a threshold rank" in the present specification means a value rank larger than the threshold rank. For example, a threshold rank k or less means ranks k to N. Similarly, the expression "equal to or higher than the threshold rank" or "higher than the threshold rank" means a rank smaller than the threshold rank. For example, the threshold rank k or more means ranks 1 to k.

Specifically, a blood flow extraction filter $P_{k,N}$ is shown by the following Expression 4.

[Math. 6]

$$P_{k,N} = \sum_{i=k}^{N} \lambda_i w_i w_i^{H} \qquad \text{(Expression 4)}$$

In Expression 4, k denotes the first threshold rank. That is, the blood flow extraction filter $P_{k,N}$ is formed by adding the product of the eigenvalue $\lambda_i$ of each rank equal to or lower than the first threshold rank (k rank) and the eigenvector $w_i$, $w_i^{H}$.

The blood flow extraction filter $P_{k,N}$, which is formed based on the eigenvalue $\lambda_i$ of the lower rank (rank equal to or lower than the first threshold rank) obtained by performing singular value decomposition on the average correlation matrix and the eigenvector $w_i$, $w_i^{H}$ corresponding to the eigenvalue $\lambda_i$, extracts blood flow components representing a microvessel (blood flow) and cuts tissue components representing tissue of the subject when applied to the plurality of pieces of the frame data F (i.e. the matrix U).

Next, the blood flow luminance image forming unit 44a applies the formed blood flow extraction filter $P_{k,N}$ to the frame data F, thereby forming a blood flow luminance image $U_{k,N}$. In the present embodiment, the blood flow luminance image forming unit 44a applies the blood flow extraction filter $P_{k,N}$ to each of the plurality of pieces of the frame data F represented by the matrix U and averages signal values of the plurality of pieces of the frame data F to which the blood flow extraction filter is applied, thereby forming the blood flow luminance image $U_{k,N}$. The blood flow luminance image $U_{k,N}$ is shown by the following Expression 5.

[Math. 7]

$$U_{k,N} = \text{AVG}[P_{k,N}U] \qquad \text{(Expression 5)}$$

As described above, the blood flow extraction filter $P_{k,N}$ extracts blood flow components representing a microvessel (blood flow) and cuts tissue components representing tissue of the subject when applied to the matrix U. Thus, when the blood flow extraction filter $P_{k,N}$ is applied to the matrix U, the tissue components are cut, and the blood flow components remain. Therefore, the blood flow luminance image $U_{k, N}$ shows the blood flow components. However, as described above, the blood flow luminance image $U_{k, N}$ may include clutter components that are signal components derived from tissue due to body motion or the like of the subject.

The tissue image forming unit 44b forms a tissue image including tissue components on the basis of signal values (i.e. the matrix U) of the data elements E forming the plurality of pieces of the frame data F.

In the present embodiment, first, the tissue image forming unit 44b forms a tissue extraction filter on the basis of the eigenvalue $\lambda_i$ of a rank higher than the first threshold rank and the eigenvector $w_i$, $w_i^{H}$ corresponding to the eigenvalue $\lambda_i$ among the plurality of eigenvalues $\lambda_i$ and eigenvectors $w_i$, $w_i^{H}$ calculated by the singular value decomposition calculation unit 42.

Specifically, the tissue extraction filter $P_{2,N}$ is shown by the following Expression 6.

[Math. 8]

$$P_{2,N} = \sum_{i=2}^{2} \lambda_i w_i w_i^{H} \qquad \text{(Expression 6)}$$

As shown by Expression 6, in the present embodiment, the tissue extraction filter $P_{2,N}$ is formed based on the eigenvalue $\lambda_2$ and an eigenvector $w_2$, $w_2^{H}$ of the rank 2 (the first threshold rank k is higher than 2). In the present embodiment, the tissue extraction filter $P_{2,N}$ is formed based on the eigenvalue $\lambda_2$ and the eigenvector $w_2$, $w_2^{H}$ of the rank 2 (reason thereof will be described later). However, the tissue extraction filter $P_{2,N}$ may be formed based on the eigenvalue $\lambda_i$ and the eigenvector $w_i$, $w_i^{H}$ of another rank if the other rank is higher than the first threshold rank k and is considerably high. The tissue extraction filter $P_{2,N}$ may also be formed by adding the products of the eigenvalues $\lambda_i$ and the eigenvectors $w_i$, will of a plurality of ranks (e.g. ranks 1 to 3).

The tissue extraction filter $P_{2,N}$, which is formed based on the eigenvalue $\lambda_i$ of the higher rank obtained by performing singular value decomposition on the average correlation matrix and the eigenvector $w_i$, $w_i^{H}$ corresponding to the eigenvalue $\lambda_i$, extracts tissue components representing tissue of the subject and cuts blood flow components representing a microvessel (blood flow) when applied to the plurality of pieces of the frame data F (i.e. the matrix U).

Next, the tissue image forming unit 44b applies the formed tissue extraction filter $P_{2,N}$ to the frame data F, thereby forming a tissue image $U_{2,N}$. In the present embodiment, the tissue image forming unit 44b applies the tissue extraction filter $P_{2,N}$ to each of the plurality of pieces of the frame data F represented by the matrix U and obtains a variance value of signal values of the plurality of pieces of the frame data F to which the tissue extraction filter is applied, thereby forming the tissue image $U_{2,N}$. The tissue image $U_{2,N}$ is shown by the following Expression 7.

[Math. 9]

$$U_{2,N} = \text{VAR}[P_{2,N}U] \qquad \text{(Expression 7)}$$

As described above, when applied to the matrix U, the tissue extraction filter $P_{2,N}$ extracts tissue components representing tissue of the subject and cuts blood flow components representing a microvessel (blood flow). Thus, when the tissue extraction filter $P_{2,N}$ is applied to the matrix U, the blood flow components are cut, and the tissue components remain. Therefore, the tissue image $U_{2,N}$ shows the tissue components. The tissue image $U_{2,N}$ also includes clutter components that are signal components derived from tissue due to body motion or the like of the subject.

Figure 5:
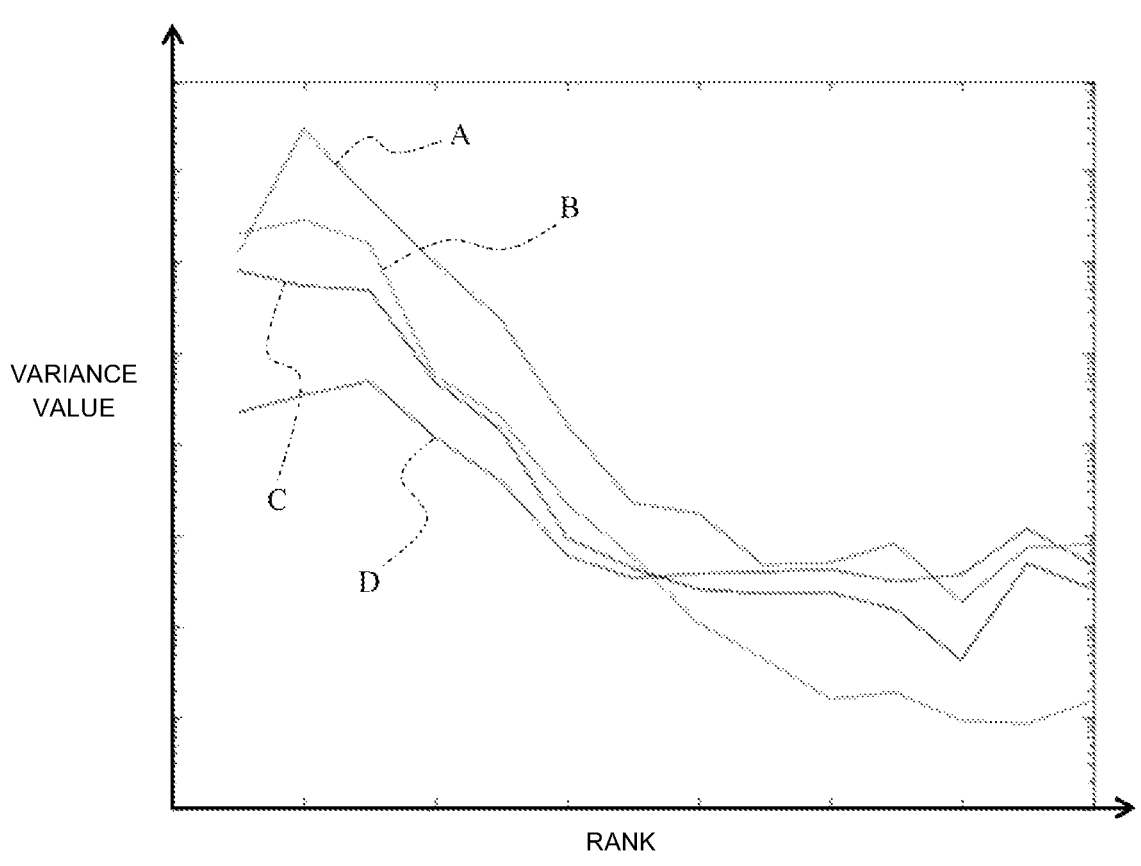
FIG. 5 is a graph showing a relationship between a rank and a variance value of signal values of frame data to which a filter of the rank is applied.

In particular, the variance value of the signal values of the plurality of pieces of the frame data F to which the tissue extraction filter $P_{2,N}$ is applied includes many clutter components. FIG. 5 is a graph showing a relationship between a rank of a filter formed based on an eigenvalue and an eigenvector and a variance value of signal values of a plurality of pieces of the frame data F to which the filter of the rank is applied. In the graph of FIG. 5, a graph A represents clutter components, a graph B represents tissue components, a graph C represents blood flow components, and a graph D represents branch components corresponding to a branch of a blood flow. As shown in FIG. 5, the variance values of the graph A are larger as the rank is higher. That is, the tissue image $U_{2,N}$, which is obtained by applying the tissue extraction filter $P_{2,N}$ formed based on the eigenvalue $\lambda_i$ and the eigenvector $w_i$, $w_i^H$ of a higher rank to the matrix U, includes not only tissue components but also many clutter components.

In the graph A of FIG. 5, the variance value of the clutter components is larger in a rank slightly lower than the rank 1 (e.g. the rank 2) than in the rank 1. This is because signal components extracted by the filter of the rank 1 tend to include many temporally stable signal components, and the rank 2 and subsequent ranks include more temporally and spatially varying signal components. Therefore, in the present embodiment, the tissue extraction filter $P_{2,N}$ is formed based on the eigenvalue $\lambda_2$ and the eigenvector $w_2$, $w_2^H$ of the rank 2.

The relationship between the variance value of the signal values of the plurality of pieces of the frame data F to which the tissue extraction filter $P_{2,N}$ is applied and the rank of the filter is as shown in FIG. 5. A relationship between an average value of the signal values of the plurality of pieces of the frame data F to which the tissue extraction filter $P_{2,N}$ is applied and the rank of the filter is also similar to that of FIG. 5. Therefore, the tissue image $U_{2,N}$ may be formed by obtaining the average value of the signal values of the plurality of pieces of the frame data F to which the tissue extraction filter $P_{2,N}$ is applied.

As described above, in the present embodiment, the tissue image forming unit 44b forms the tissue image $U_{2,N}$ on the basis of the tissue extraction filter $P_{2,N}$, but the tissue image may be formed without forming the tissue extraction filter. Specifically, the tissue image may be formed by taking the variance value of the signal values (i.e. the matrix U) of the plurality of pieces of the frame data F. In that case, a tissue image $U_{org,N}$ is formed by the following Expression 8.

[Math. 10]

$$U_{org,N} = \text{VAR}[U] \qquad \text{(Expression 8)}$$

As described later, the tissue image may include many clutter components in order to form a blood flow extraction image having reduced clutter components. As shown in FIG. 5, the variance value of the clutter components (graph A) takes a relatively large value from a higher rank to a lower rank. Therefore, it is possible to obtain the tissue image $U_{org,N}$ including many clutter components also by taking the variance value of the matrix U, instead of applying the tissue extraction filter.

The blood flow extraction image forming unit 44c subtracts the tissue image $U_{2,N}$ (or the tissue image $U_{org,N}$) formed by the tissue image forming unit 44b from the blood flow luminance image $U_{k,N}$ formed by the blood flow luminance image forming unit 44a, thereby forming a blood flow extraction image. That is, the blood flow extraction image $U_{out}$ is shown by the following Expression 9.

[Math. 11]

$$U_{out} = U_{k,N} - \alpha U_{2,N} \text{ or } U_{out} = U_{k,N} - \alpha U_{org,N}, N \qquad \text{(Expression 9)}$$

As described above, the blood flow luminance image $U_{k,N}$ may include clutter components, and the tissue image $U_{2,N}$ cuts the blood flow components and includes many clutter components. The blood flow components are not cut in the tissue image $U_{org,N}$, but, in the matrix U, the blood flow components have lower signal intensity than the clutter components in the first place. Therefore, when the tissue image $U_{2,N}$ (or the tissue image $U_{org,N}$) is subtracted from the blood flow luminance image $U_{k,N}$, the blood flow extraction image $U_{out}$ can be obtained by removing the clutter components from the blood flow luminance image $U_{k,N}$ while leaving the blood flow components therein.

In Expression 9, $\alpha$ denotes a coefficient related to the tissue image $U_{2,N}$ (or the tissue image $U_{org,N}$). That is, in the present embodiment, the blood flow extraction image forming unit 44c subtracts the tissue image $U_{2,N}$ (or the tissue image $U_{org,N}$) multiplied by the coefficient from the blood flow luminance image $U_{k,N}$, thereby forming the blood flow extraction image $U_{out}$. An amount of signals to be subtracted from the blood flow luminance image $U_{k,N}$ can be adjusted by adjusting the coefficient $\alpha$. That is, when the coefficient $\alpha$ is increased, the clutter components are further reduced from the blood flow luminance image $U_{k,N}$, but the blood flow components and the tissue components may also be further reduced. When the coefficient $\alpha$ is reduced, the clutter components are not reduced much from the blood flow luminance image $U_{k,N}$, but reduction amounts of the blood flow components and the tissue components are also suppressed.

Figure 6A:
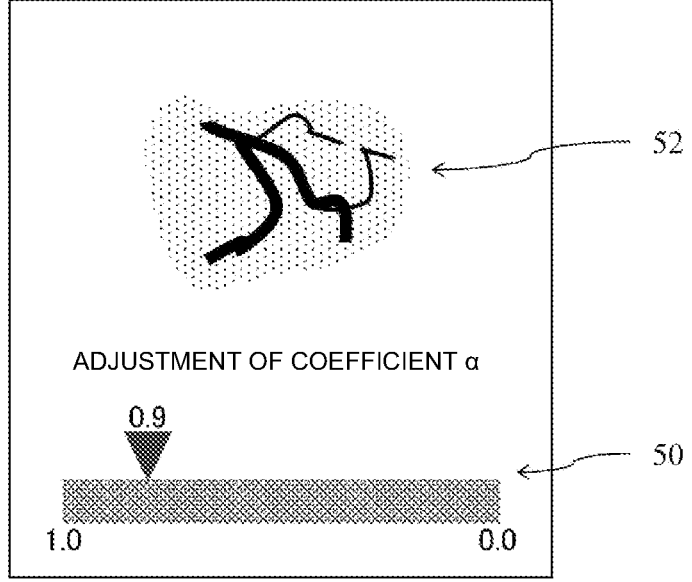
FIG. 6A illustrates a first example of a screen for determining a coefficient of a tissue image.
Figure 6B:
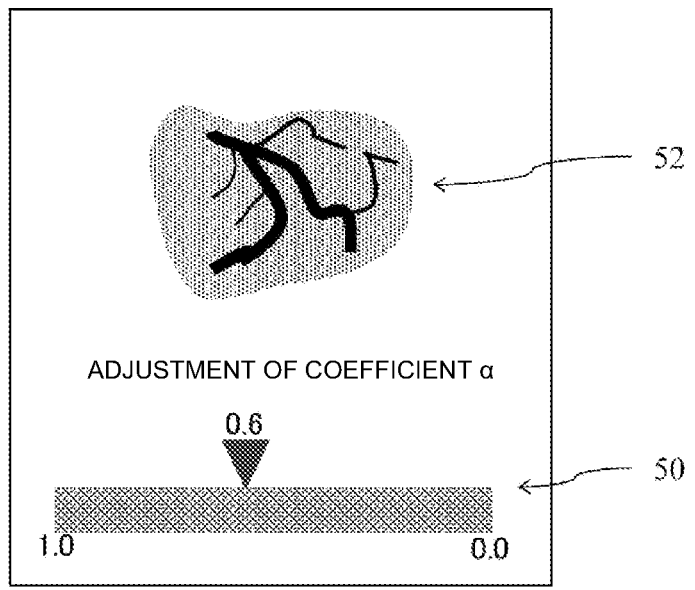
FIG. 6B illustrates a second example of a screen for determining a coefficient of a tissue image.

The blood flow extraction image forming unit 44c may determine the coefficient $\alpha$ on the basis of input from the user of the ultrasound diagnostic device 10. Therefore, the user can obtain the blood flow extraction image $U_{out}$ by subtracting a desired amount of signals from the blood flow luminance image $U_{k,N}$. For example, the display control unit 24 may display a coefficient adjustment operator (slide bar) 50 on the display 26 as illustrated in FIGS. 6A and 6B, and the user may be able to adjust the coefficient $\alpha$ by operating the coefficient adjustment operator 50 using the input interface 28. The display control unit 24 may also display a blood flow extraction image 52 calculated by using the adjusted coefficient $\alpha$ on the screen such that the user can easily grasp how the blood flow extraction image $U_{out}$ changes by changing the coefficient $\alpha$.

Returning to FIG. 2, the blood flow visualization unit 22 may include a calculation target region specification unit 46. In the above embodiment, the correlation matrix calculation unit 40 calculates the correlation matrix $R_{zx}$ for the entire frame data F (all the vectors $u_{zx}$ (z=1 to Z, x=1 to X)). However, the correlation matrix $R_{zx}$ is subjected to singular value decomposition to form the blood flow extraction filter $P_{k,N}$ or the tissue extraction filter $P_{2,N}$. Therefore, as a result of singular value decomposition of the correlation matrix $R_{zx}$, it is not always necessary to obtain the correlation matrix $R_{zx}$ for the entire frame data F, so long as the tissue extraction filter $P_{2,N}$ can be formed based on the signal components of a higher rank and the blood flow extraction filter $P_{k,N}$ can be formed based on the signal components of a lower rank. Therefore, with the above configuration, a calculation target of the correlation matrix $R_{zx}$ is limited, and thus the amount of calculation for obtaining the correlation matrix $R_{zx}$ can be reduced.

In view of the above, before the correlation matrix calculation unit 40 calculates the correlation matrix $R_{zx}$, the calculation target region specification unit 46 specifies some data elements E (vectors $u_{zx}$) of the frame data F as a calculation target region that is a calculation target of the correlation matrix $R_{zx}$. The correlation matrix calculation unit 40 calculates the correlation matrix $R_{zx}$ only for the specified calculation target region. Therefore, the amount of calculation for obtaining the correlation matrix $R_{zx}$ and the amount of calculation for obtaining the average correlation matrix $R_{zx}$ by the correlation matrix calculation unit 40 are reduced.

The calculation target region specification unit 46 can specify the calculation target region by various methods. However, when the calculation target region includes only data elements E corresponding to a microvessel (blood flow), the correlation matrix calculation unit 40 cannot calculate an appropriate correlation matrix $R_{zx}$ for forming the tissue extraction filter $P_{2,N}$ and the blood flow extraction filter $P_{k,N}$. Thus, the calculation target region specification unit 46 specifies a calculation target region including at least a data element E corresponding to tissue.

Figure 7A:
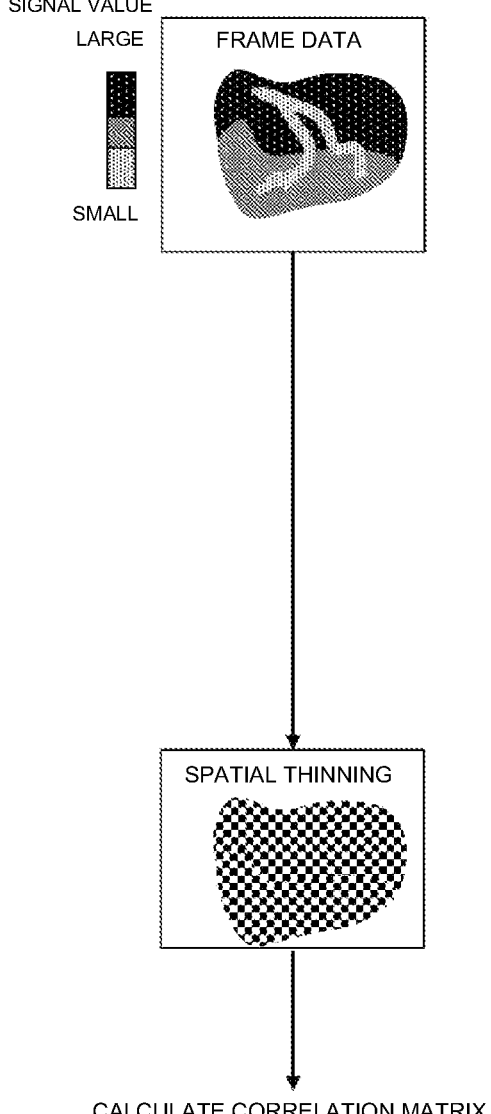
FIG. 7A is a first conceptual diagram illustrating content of processing performed by a calculation target region specification unit.

As a first method of specifying the calculation target region, the calculation target region specification unit 46 can set, as the calculation target region, thinned frame data obtained by thinning out some of the data elements E forming the frame data F, as illustrated in FIG. 7A. As an exemplary thinning method, the data elements E included in the calculation target region and the data elements E not included in the calculation target region are alternately arranged in the X-axis direction and the Z-axis direction (see FIG. 3). However, the thinning method may be any method, so long as the data elements E corresponding to tissue are included in the calculation target region.

Figure 7B:
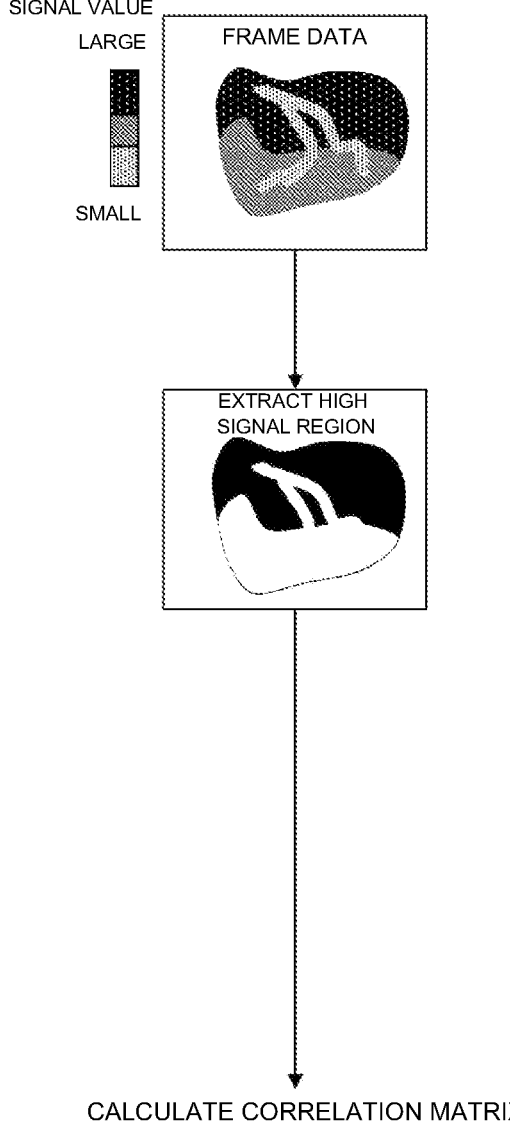
FIG. 7B is a second conceptual diagram illustrating content of processing performed by a calculation target region specification unit.

As a second method of specifying the calculation target region, the calculation target region specification unit 46 can specify, as the calculation target region, a set of data elements E having signal values equal to or larger than a threshold signal value among the plurality of data elements E forming the frame data F, as illustrated in FIG. 7B. The data elements E corresponding to tissue generally have relatively large signal values. Therefore, when the set of the data elements E having signal values equal to or larger than the threshold signal value is set as the calculation target region, it is possible to specify the calculation target region including the data elements E corresponding to tissue.

Figure 7C:
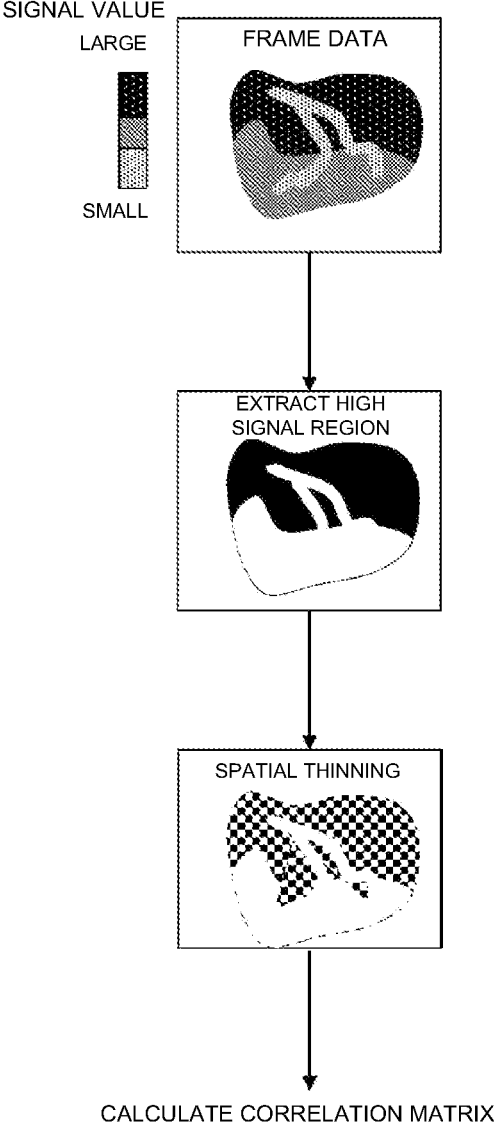
FIG. 7C is a third conceptual diagram illustrating content of processing performed by a calculation target region specification unit.

As a third method of specifying the calculation target region, the calculation target region specification unit 46 can use a combination of the first specification method and the second specification method. That is, as illustrated in FIG. 7C, the calculation target region specification unit 46 can extract a set of data elements E having signal values equal to or larger than the threshold signal value among the plurality of data elements E forming the frame data F, then thin out some of the plurality of extracted data elements E, and set the thinned frame data as the calculation target region. Alternatively, the calculation target region specification unit 46 can thin out some of the data elements E forming the frame data F to obtain thinned frame data and then set, as the calculation target region, a set of data elements E having signal values equal to or larger than the threshold signal value among the plurality of data elements E forming the thinned frame data.

Figure 7D:
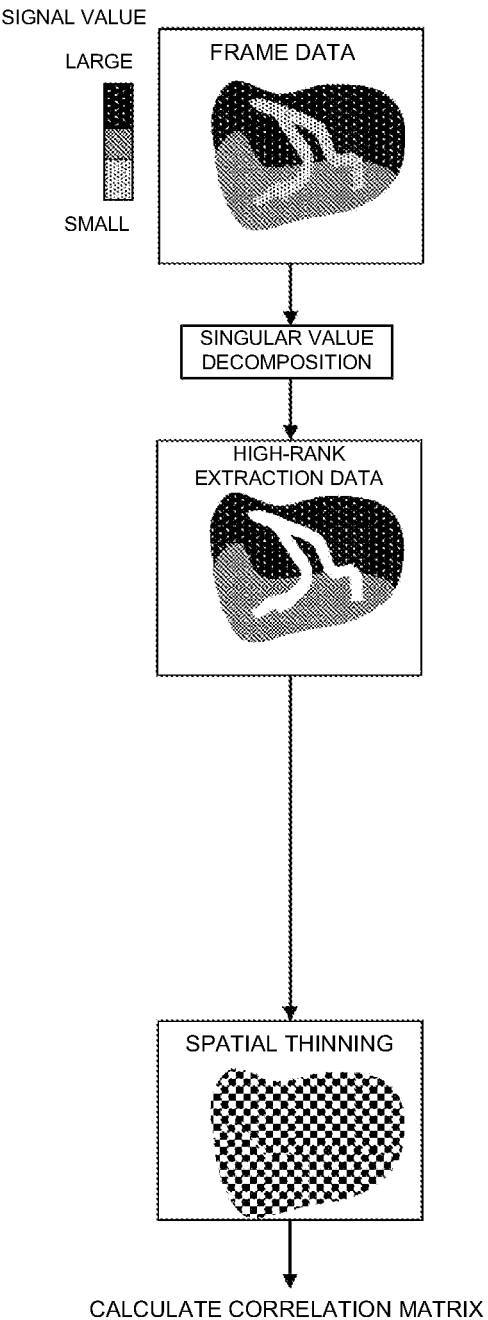
FIG. 7D is a fourth conceptual diagram illustrating content of processing performed by a calculation target region specification unit.

As a fourth method of specifying the calculation target region, the calculation target region specification unit 46 first performs singular value decomposition on the plurality of pieces of the frame data F. By the singular value decomposition, a higher rank includes many signal components (e.g. tissue components) having a large signal value, and a lower rank includes many signal components (e.g. blood flow components) having a small signal value. Therefore, first, as illustrated in FIG. 7D, the calculation target region specification unit 46 acquires high-rank extraction data including the signal components of the higher rank (specifically, a rank higher than the predetermined second threshold rank) obtained by singular value decomposition. The high-rank extraction data mainly shows tissue components. Then, the calculation target region specification unit 46 can set, as the calculation target region, thinned frame data obtained by thinning out some of the data elements E forming the acquired high-rank extraction data.

Figure 7E:
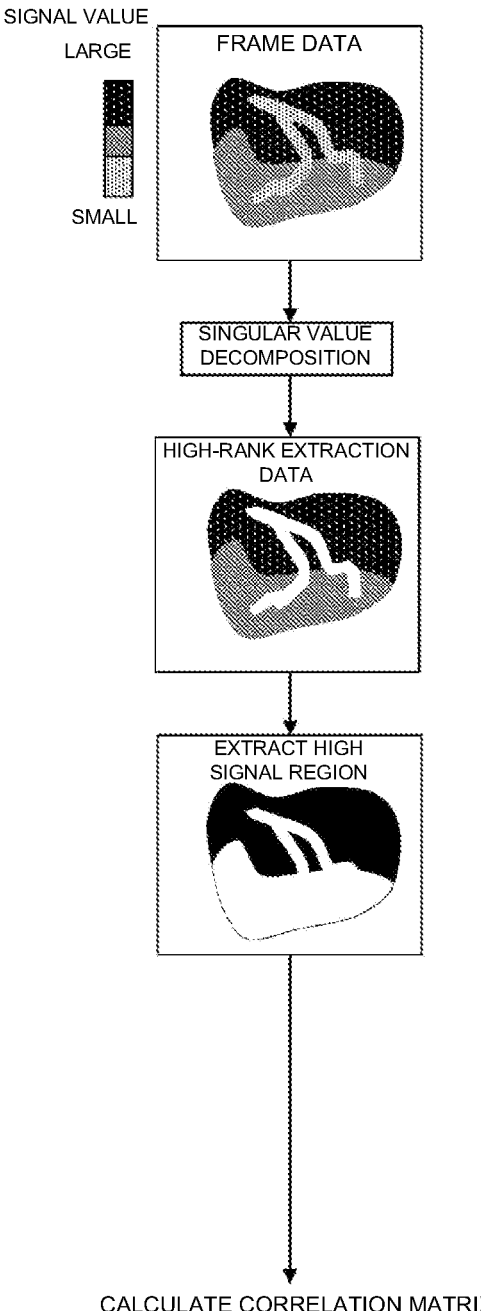
FIG. 7E is a fifth conceptual diagram illustrating content of processing performed by a calculation target region specification unit.

As a fifth method of specifying the calculation target region, the calculation target region specification unit 46 acquires high-rank extraction data in a similar way to the fourth specification method, and, as illustrated in FIG. 7E, the calculation target region specification unit 46 can specify, as the calculation target region, a set of data elements E having signal values equal to or larger than the threshold signal value among the plurality of data elements E forming the acquired high-rank extraction data.

Figure 7F:
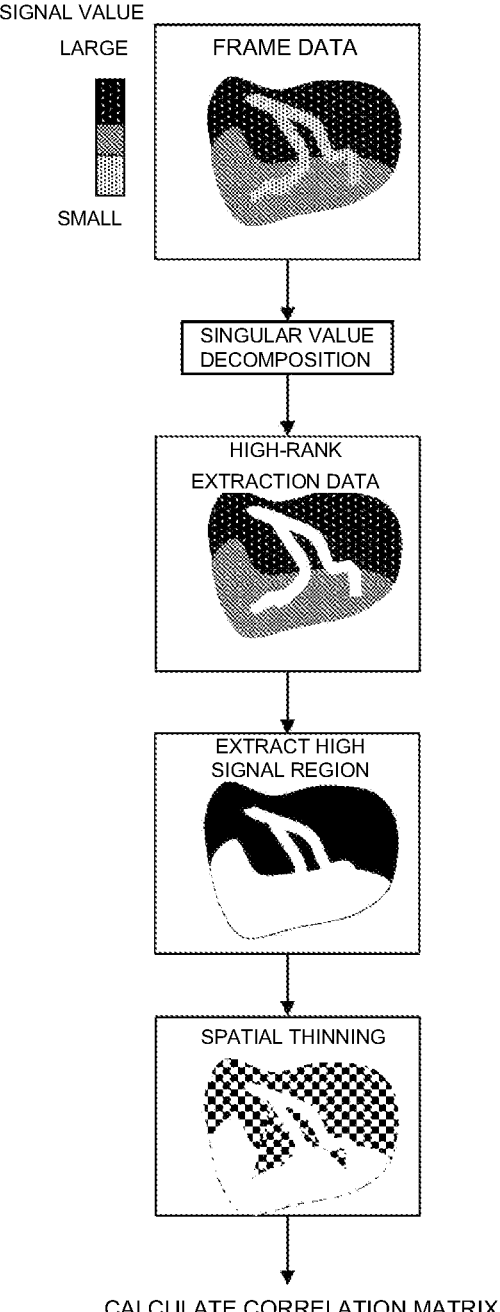
FIG. 7F is a sixth conceptual diagram illustrating content of processing performed by a calculation target region specification unit.

As a sixth method of specifying the calculation target region, the calculation target region specification unit 46 can use a combination of the fourth specification method and the fifth specification method. That is, as illustrated in FIG. 7F, the calculation target region specification unit 46 can acquire high-rank extraction data, extract a set of data elements E having signal values equal to or larger than the threshold signal value among a plurality of data elements E forming the acquired high-rank extraction data, then thin out some of the plurality of extracted data elements E, and set the thinned frame data as the calculation target region. Alternatively, the calculation target region specification unit 46 can thin out some of the data elements E forming the acquired high-rank extraction data to obtain thinned frame data and then set, as the calculation target region, a set of data elements E having signal values equal to or larger than the threshold signal value among the plurality of data elements E forming the thinned frame data.

As described above, the correlation matrix $R_{zx}$ is used to form the blood flow extraction filter $P_{k,N}$ or the tissue extraction filter $P_{2,N}$. Therefore, as in the present embodiment, in a case where processing of obtaining the blood flow extraction image $U_{out}$ is performed on the basis of the blood flow luminance image $U_{k,N}$ and the tissue image $U_{2,N}$, the calculation target region specification unit 46 specifies the calculation target region. This makes it possible to reduce, for example, the amount of calculation for obtaining the correlation matrix $R_{zx}$. Further, also in a case where various types of processing are performed by using the blood flow extraction filter $P_{k,N}$ or the tissue extraction filter $P_{2,N}$, it is possible to reduce, for example, the amount of calculation for obtaining the correlation matrix $R_{zx}$. For example, it is possible to reduce, for example, the amount of calculation for obtaining the correlation matrix $R_{zx}$ also in the following cases: a case where the image forming unit 44 performs blood flow luminance image formation processing of forming the blood flow luminance image $U_{k,N}$ by applying the blood flow extraction filter $P_{k,N}$ to the frame data F (e.g. the matrix U), and the display control unit 24 displays the blood flow luminance image $U_{k,N}$ on the display 26; and a case where the image forming unit 44 performs tissue image formation processing of forming the tissue image $U_{2,N}$ by applying the tissue extraction filter $P_{2,N}$ to the frame data F (e.g. the matrix U), and the display control unit 24 displays the tissue image $U_{2,N}$ on the display 26.

In the above embodiment, the correlation matrix $R_{zx}$ (specifically, the average correlation matrix) to be subjected to singular value decomposition is a square matrix, and the singular value decomposition calculation unit 42 performs eigenvalue decomposition on the square matrix. However, the matrix to be subjected to singular value decomposition may be a non-square matrix, and the singular value decomposition calculation unit 42 may perform singular value decomposition on the non-square matrix.

In this case, the correlation matrix calculation unit 40 generates, as the correlation matrix, a spatiotemporal matrix S in which a space (ZX (Z-axis direction and X-axis direction in FIG. 3)) is arranged in a row direction, and time (N) is arranged in a column direction on the basis of the plurality of pieces of the frame data F (i.e. the matrix U) stored in the cine memory 20. The spatiotemporal matrix S is a matrix of ZX×N and is a non-square matrix. The singular value decomposition calculation unit 42 performs singular value decomposition on the spatiotemporal matrix S that is a non-square matrix. The singular value decomposition here is shown by the following Expression 10.

[Math. 12]

$$S = V\Lambda W^H = \sum_{i=1}^{N} \lambda_i v_i w_i^H \qquad \text{(Expression 10)}$$

In Expression 10, V is a left singular vector and is a square matrix of ZX×ZX, W is a right singular vector and is a square matrix of N×N, and the matrix $\Lambda$ is a matrix of ZN×N in which the singular values $\lambda_i$ are arranged in order of magnitude. Ranks of the plurality of singular values $\lambda_i$ are defined in order of magnitude thereof. Here, the singular value $\lambda_i$ and a singular vector $v_i$, $w_i^H$ of a higher rank include many tissue components representing tissue of the subject, and the singular value $\lambda_i$ and the singular vector $w_i$, $w_i^H$ of a lower rank include many blood flow components representing a microvessel (blood flow).

The blood flow luminance image forming unit 44a extracts the singular value $\lambda_i$ of a rank equal to or lower than the first threshold rank and the singular vector $v_i$, $w_i^H$ corresponding to the singular value $\lambda_i$ as a blood flow component and reconverts a matrix into a vector in which elements are arranged in the N direction, where the row direction is X and the column direction is Z, thereby obtaining a blood flow component matrix $S_{k,N}$.

The blood flow component matrix $S_{k,N}$ is shown by the following Expression 11.

[Math. 13]

$$S_{k,N} = \sum_{i=k}^{N} \lambda_i v_i w_i^H \qquad \text{(Expression 11)}$$

Next, the blood flow luminance image forming unit 44a forms a blood flow luminance image $S_{k,avg}$ by averaging the blood flow component matrix $S_{k,N}$. The blood flow luminance image $S_{k,avg}$ is shown by the following Expression 12.

[Math. 14]

$$S_{k,avg} = \text{AVG}[S_{k,N}] \qquad \text{(Expression 12)}$$

The tissue image forming unit 44b extracts the singular value $\lambda_2$ of a rank higher than the first threshold rank (here, the rank 2) and a singular vector $v_2$, $w_2^H$ corresponding to the singular value $\lambda_2$ as a tissue component and reconverts a matrix into a vector in which elements are arranged in the N direction, where the row direction is X and the column direction is Z, thereby obtaining a tissue component matrix $S_{2,N}$. The tissue component matrix $S_{2,N}$ is shown by the following Expression 13.

[Math. 15]

$$S_{2,N} = \sum_{i=2}^{2} \lambda_i v_i w_i^H \qquad \text{(Expression 13)}$$

Next, the tissue image forming unit 44b obtains a variance of the tissue component matrix $S_{2,N}$, thereby forming a tissue image $S_{2,var}$. The tissue image $S_{2,var}$ is shown by the following Expression 14.

[Math. 16]

$$S_{2,var} = \text{VAR}[S_{2,N}] \qquad \text{(Expression 14)}$$

The blood flow extraction image forming unit 44c subtracts the tissue image $S_{2,var}$ formed by the tissue image forming unit 44b from the blood flow luminance image $S_{k,avg}$ formed by the blood flow luminance image forming unit 44a, thereby forming the blood flow extraction image $U_{out}$. The blood flow extraction image $U_{out}$ is shown by the following Expression 15.

[Math. 17]

$$U_{out} = S_{k,avg} - \alpha S_{2,var} \qquad \text{(Expression 15)}$$

Figure 8:
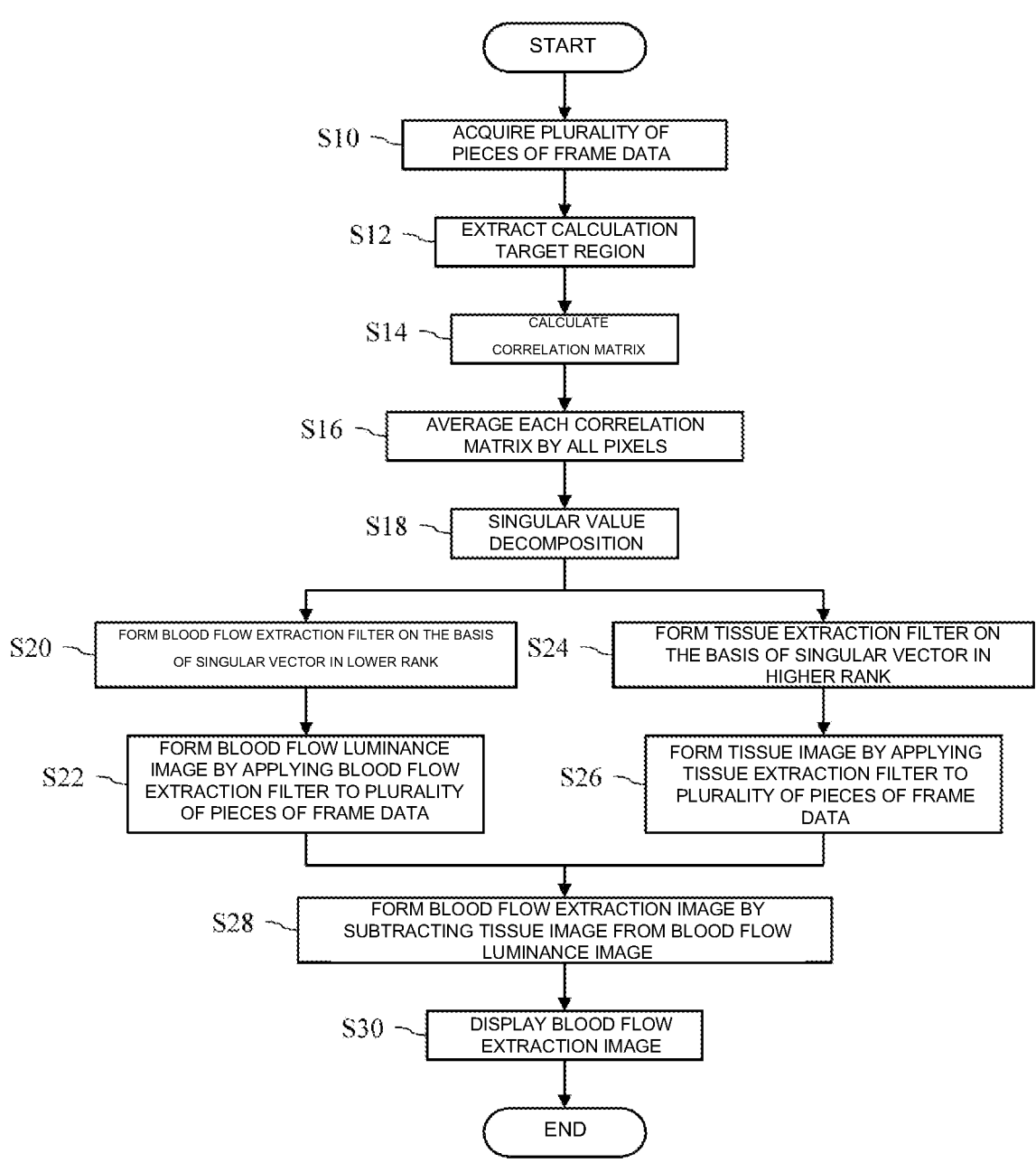
FIG. 8 is a flowchart showing a flow of processing of the ultrasound diagnostic device according to the present embodiment.

The overview of the configuration of the ultrasound diagnostic device 10 according to the present embodiment has been described above. Hereinafter, a flow of the processing of the ultrasound diagnostic device 10 will be described with reference to a flowchart of FIG. 8.

In step S10, the probe 12 transmits ultrasonic waves to the same scanning plane a plurality of times in response to transmission signals from the transmission unit 14, and the receiving unit 16 generates a plurality of pieces of frame data F on the basis of a plurality of reception signals obtained by receiving reflected waves of the ultrasonic waves from the subject. Therefore, the plurality of pieces of the frame data F having signal values indicating signal intensity of the reflected waves are acquired. Step S10 corresponds to a frame data acquisition step.

In step S12, the calculation target region specification unit 46 specifies a calculation target region that is a calculation target of the correlation matrix $R_{zx}$ in the frame data F, by any of the above methods.

In step S14, the correlation matrix calculation unit 40 calculates the correlation matrix $R_{zx}$ indicating a correlation between signal values in the plurality of pieces of the frame data F for each data element E included in the calculation target region specified in step S12 among data elements E included in the frame data F acquired in step S10 (see Expression 1). Step S14 corresponds to a correlation matrix calculation step.

In step S16, the correlation matrix calculation unit 40 obtains an average correlation matrix by averaging each correlation matrix $R_{zx}$ for each vector $u_{zx}$ by all the data elements E (see Expression 2).

In step S18, the singular value decomposition calculation unit 42 performs singular value decomposition on the average correlation matrix obtained in step S16 and calculates a plurality of singular values (here, eigenvalues) $\lambda_i$ and a plurality of singular vectors $w_i$, $w_i^H$ (here, eigenvectors) corresponding to the respective eigenvalues (see Expression 3). Step S18 corresponds to a singular value decomposition calculation step.

In step S20, the blood flow luminance image forming unit 44a forms a blood flow extraction filter $P_{k,N}$ on the basis of the eigenvalue $\lambda_i$ of a rank equal to or lower than the preset first threshold rank and the eigenvector $w_i$, $w_i^H$ corresponding to the eigenvalue among the plurality of eigenvalues $\lambda_i$ and eigenvectors $w_i$, $w_i^H$ calculated in step S18 (see Expression 4).

In step S22, the blood flow luminance image forming unit 44a applies the blood flow extraction filter $P_{k,N}$ to each of the plurality of pieces of the frame data F represented by the matrix U and averages signal values of the plurality of pieces of the frame data F to which the blood flow extraction filter is applied, thereby forming a blood flow luminance image $U_{k,N}$ (see Expression 5). Step S20 corresponds to a blood flow luminance image forming step.

In step S24, the tissue image forming unit 44b forms a tissue extraction filter $P_{2,N}$ on the basis of the eigenvalue $\lambda_i$ of a rank higher than the first threshold rank (here, the rank 2) and the eigenvector $w_i$, will corresponding to the eigenvalue $\lambda_i$ among the plurality of eigenvalues $\lambda_i$ and eigenvectors $w_i$, $w_i^H$ calculated in step S18 (see Expression 6).

In step S26, the tissue image forming unit 44b applies the tissue extraction filter $P_{2,N}$ to each of the plurality of pieces of the frame data F represented by the matrix U and obtains a variance value of signal values of the plurality of pieces of the frame data F to which the tissue extraction filter is applied, thereby forming a tissue image $U_{2,N}$ (see Expression 7). Step S26 corresponds to a tissue image forming step.

In step S28, the blood flow extraction image forming unit 44c subtracts the tissue image $U_{2,N}$ formed in step S26 from the blood flow luminance image $U_{k,N}$ formed in step S22, thereby forming a blood flow extraction image $U_{out}$ (see Expression 9). Step S28 corresponds to a blood flow extraction image forming step.

In step S30, the display control unit 24 displays on the display 26 the blood flow extraction image $U_{out}$ formed in step S28.

Hereinabove, the blood flow extraction image forming device according to the present disclosure has been described above. However, the blood flow extraction image forming device according to the present disclosure is not limited to the above embodiment, and various modifications can be made without departing from the gist thereof.

For example, in the present embodiment, the blood flow extraction image forming device is the ultrasound diagnostic device 10. However, the blood flow extraction image forming device is not limited to the ultrasound diagnostic device 10 and may be another computer. In this case, a computer serving as the blood flow extraction image forming device has the function of the blood flow visualization unit 22. Specifically, the computer serving as the blood flow extraction image forming device receives a plurality of pieces of frame data from the ultrasound diagnostic device and performs, on the plurality of pieces of the frame data, the processing of calculating the correlation matrix $R_{zx}$, the processing of generating the blood flow extraction filter $P_{k,N}$ and the tissue extraction filter $P_{2,N}$, and the processing of forming the blood flow luminance image $U_{k,N}$, the tissue image $U_{2,N}$ (or the tissue image $U_{org,N}$), and the blood flow extraction image $U_{out}$.

In the above embodiment, a target to be processed by the blood flow visualization unit 22 is the plurality of pieces of the frame data F, and the matrix U indicates the signal values of the data elements of the pieces of the frame data F. However, the target to be processed by the blood flow visualization unit 22 may be an ultrasonic image (B-mode image) generated by converting the signal values of the plurality of pieces of the frame data F into luminance values. In this case, the matrix U indicates the luminance values of the respective pixels of each ultrasonic image.

The invention claimed is:

1. A blood flow extraction image forming device comprising one or more processors configured to perform a method for forming a blood flow extraction image, the method comprising:

acquiring a plurality of pieces of frame data for a plurality of frames, the plurality of pieces of the frame data being generated on the basis of a plurality of reception signals obtained by causing an ultrasonic probe that transmits and receives ultrasonic waves to and from a subject, to transmit ultrasonic waves to a same scanning plane a plurality of times and receive reflected waves of the ultrasonic waves from the subject and having signal values indicating signal intensity of the reflected waves;

calculating a correlation matrix indicating a correlation between the signal values in the plurality of pieces of the frame data for each data element of the frame data corresponding to each pixel of an ultrasonic image formed based on the frame data;

performing singular value decomposition on the correlation matrix to calculate a plurality of singular values whose ranks are defined in order of magnitude and a plurality of singular vectors corresponding to the singular values;

forming a blood flow luminance image by applying, to the frame data, a blood flow extraction filter formed based on the singular value of a rank equal to or lower than a preset first threshold rank and the singular vector corresponding to the singular value;

forming a tissue image on the basis of the signal value of each data element forming the plurality of pieces of the frame data;

forming a blood flow extraction image by subtracting the tissue image from the blood flow luminance image;

specifying a calculation target region including one or more data elements corresponding to tissue in the frame data, the correlation matrix being calculated in the method only for the calculation target region;

acquiring high-rank extraction data including signal components of a rank higher than a second threshold rank, by performing singular value decomposition on the plurality of pieces of the frame data;

thinning out some of data elements forming the high-rank extraction data; and setting thinned frame data as the calculation target region.

2. The blood flow extraction image forming device according to claim 1, wherein the tissue image is formed in the method by applying, to the frame data, a tissue extraction filter formed based on the singular value of a rank higher than the first threshold rank and the singular vector corresponding to the singular value.

3. The blood flow extraction image forming device according to claim 1, wherein the blood flow extraction image is formed by subtracting the tissue image multiplied by a coefficient from the blood flow luminance image.

4. The blood flow extraction image forming device according to claim 3, the method performed by the one or more processors further comprising:

determining the coefficient on the basis of input from a user.

5. A blood flow extraction image forming device comprising one or more processors configured to perform a method for forming a blood flow extraction image, the method comprising:

acquiring a plurality of pieces of frame data for a plurality of frames, the plurality of pieces of the frame data being generated on the basis of a plurality of reception signals obtained by causing an ultrasonic probe that transmits and receives ultrasonic waves to and from a subject, to transmit ultrasonic waves to a same scanning plane a plurality of times and receive reflected waves of the ultrasonic waves from the subject and having signal values indicating signal intensity of the reflected waves;

calculating a correlation matrix indicating a correlation between the signal values in the plurality of pieces of the frame data for each data element of the frame data corresponding to each pixel of an ultrasonic image formed based on the frame data;

performing singular value decomposition on the correlation matrix to calculate a plurality of singular values whose ranks are defined in order of magnitude and a plurality of singular vectors corresponding to the singular values;

forming a blood flow luminance image by applying, to the frame data, a blood flow extraction filter formed based on the singular value of a rank equal to or lower than a preset first threshold rank and the singular vector corresponding to the singular value;

forming a tissue image on the basis of the signal value of each data element forming the plurality of pieces of the frame data;

forming a blood flow extraction image by subtracting the tissue image from the blood flow luminance image;

specifying a calculation target region including the data element corresponding to tissue in the frame data, the correlation matrix being calculated in the method only for the calculation target region;

acquiring high-rank extraction data including signal components of a rank higher than a second threshold rank by performing singular value decomposition on the plurality of pieces of the frame data; and setting, as the calculation target region, a set of the data elements having the signal values equal to or larger than a threshold signal value among the plurality of data elements forming the high-rank extraction data.

6. A blood flow extraction image forming device comprising one or more processors configured to perform a method for forming a blood flow extraction image, the method performed by the one or more processors comprising:

acquiring a plurality of pieces of frame data for a plurality of frames, the plurality of pieces of the frame data being generated on the basis of a plurality of reception signals obtained by causing an ultrasonic probe that transmits and receives ultrasonic waves to and from a subject, to transmit ultrasonic waves to a same scanning plane a plurality of times and receive reflected waves of the ultrasonic waves from the subject and having signal values indicating signal intensity of the reflected waves;

specifying, in the frame data, a calculation target region including a data element of the frame data corresponding to each pixel of an ultrasonic image formed based on the frame data, the data element corresponding to tissue;

calculating a correlation matrix indicating a correlation between the signal values in the plurality of pieces of the frame data for each data element forming the frame data, the correlation matrix being calculated only for the calculation target region;

performing singular value decomposition on the correlation matrix to calculate a plurality of singular values whose ranks are defined in order of magnitude and a plurality of singular vectors corresponding to the singular values;

forming a blood flow luminance image by applying, to the frame data, a blood flow extraction filter formed based on the singular value of a rank equal to or lower than a preset first threshold rank and the singular vector corresponding to the singular value;

forming a tissue image by applying, to the frame data, a tissue extraction filter formed based on the singular value of a rank higher than the first threshold rank and the singular vector corresponding to the singular value; and forming a blood flow extraction image by subtracting the tissue image from the blood flow luminance image;

acquiring high-rank extraction data including signal components of a rank higher than a second threshold rank, by performing singular value decomposition on the plurality of pieces of the frame data;

thinning out some of data elements forming the high-rank extraction data; and setting thinned frame data as the calculation target region.

7. A method of forming a blood flow extraction image, the method comprising:

a frame data acquisition step of acquiring a plurality of pieces of frame data for a plurality of frames, the plurality of pieces of the frame data being generated on the basis of a plurality of reception signals obtained by causing an ultrasonic probe that transmits and receives ultrasonic waves to and from a subject, to transmit ultrasonic waves to a same scanning plane a plurality of times and receive reflected waves of the ultrasonic waves from the subject and having signal values indicating signal intensity of the reflected waves;

a correlation matrix calculation step of calculating a correlation matrix indicating a correlation between the signal values in the plurality of pieces of the frame data for each data element of the frame data corresponding to each pixel of an ultrasonic image formed based on the frame data;

a singular value decomposition calculation step of performing singular value decomposition on the correlation matrix to calculate a plurality of singular values whose ranks are defined in order of magnitude and a plurality of singular vectors corresponding to the singular values;

a blood flow luminance image forming step of forming a blood flow luminance image by applying, to the frame data, a blood flow extraction filter formed based on the singular value of a rank equal to or lower than a preset first threshold rank and the singular vector corresponding to the singular value;

a tissue image forming step of forming a tissue image on the basis of the signal value of each data element forming the plurality of pieces of the frame data;

a blood flow extraction image forming step of forming a blood flow extraction image by subtracting the tissue image from the blood flow luminance image;

specifying a calculation target region including one or more data elements corresponding to tissue in the frame data, the correlation matrix being calculated in the correlation matrix calculation step only for the calculation target region;

acquiring high-rank extraction data including signal components of a rank higher than a second threshold rank, by performing singular value decomposition on the plurality of pieces of the frame data;

thinning out some of data elements forming the high-rank
  extraction data; and
setting thinned frame data as the calculation target region.

* * * * *